E. K. LIEN.
PEELING KNIFE.
APPLICATION FILED JAN. 7, 1919.
1,357,785.
Patented Nov. 2, 1920.
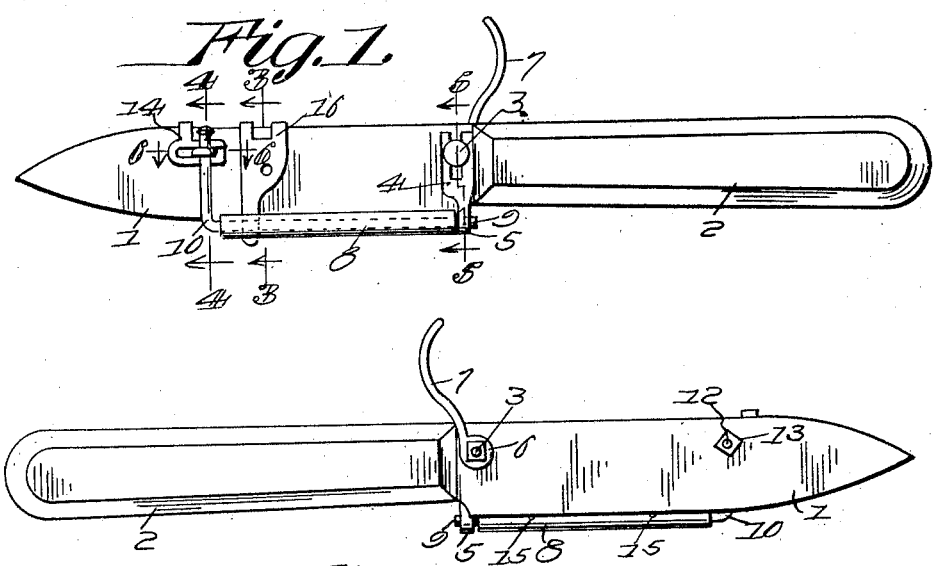
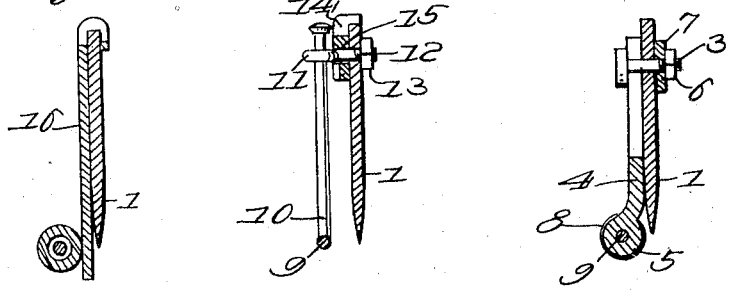
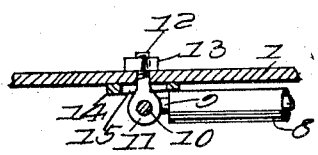
Inventor
Erick K. Lien,
By G. Wume Talbert, Attorney

UNITED STATES PATENT OFFICE.

ERICK K. LIEN, OF SAN DIEGO, CALIFORNIA.

PEELING-KNIFE.

1,357,785.  Specification of Letters Patent.  Patented Nov. 2, 1920.

Application filed January 7, 1919. Serial No. 269,982.

*To all whom it may concern:*

Be it known that I, ERICK K. LIEN, a citizen of the United States of America, residing at San Diego, in the county of San Diego and State of California, have invented new and useful Improvements in Peeling-Knives, of which the following is a specification.

The object of the invention is to provide a peeling knife peculiarly adapted for removing the skins from fruits and vegetables so that there will be a minimum of waste in the operation. To this end the invention consists in the provision of the usual form of peeling knife to which there is attached a guard to prevent the knife penetrating farther than the depth of the skin of the vegetable or fruit which it is used in peeling. The guard is provided with means so that it may roll while the knife is doing the cutting, this rolling operation adding to the freedom of movement of the knife and at the same time facilitating the disposal of the peel. Means is also provided in conjunction with the guard to enable the same to be given quickly its most effective position with reference to the knife blade and the device as a whole is further augmented by the addition of a finger grip secured to the blade by the means which secures the guard thereto, this finger grip being engageable by the forefinger to aid in holding the knife.

As shown and described, a specific embodiment of the invention is adhered to but to this embodiment the invention is not to be restricted. The right is reserved to make such changes or alterations as the actual reduction to practice may suggest in so far as such changes or alterations are compatible in spirit with the annexed claims.

In the accompanying drawings:

Figure 1 is a view in side elevation showing a peeling knife with the improved guard attached thereto.

Fig. 2 is a view looking at the opposite side of the knife.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a section on the line 6—6 of Fig. 1.

As shown in the drawings, the invention is applied to a peeling knife having a blade 1 and a handle 2. The blade adjacent the handle is provided with a perforation through which there is passed a bolt element 3 beneath whose head and the blade 1 the guard support clip 4 is carried, the body portion of this clip being bifurcated and the bolt standing between the bifurcation. When the bolt is loose, therefore, the clip 4 may be moved so as to position its eye portion 5 at a desired distance from the cutting edge of the blade 1. The bolt 3 is provided with a threaded end on which there is received a nut 6, the latter beside holding the bolt tightly also secures in position a lever 7 which abutting the handle 2 acts as a grip or rest for the forefinger of a hand when the knife is being used in the peeling operation.

The guard is in the form of a tubular member 8 loosely mounted on a pintle 9 whose one end engages in the eye 5 of the support 4. This pintle at the opposite end of the guard 8 is formed with a right angular bend 10 which is received in the eye 11 of an eye bolt 12, the latter passing through a perforation formed in the blade 1 and receiving on its end a nut 13 which secures the eye bolt in place. A U-shaped clip 14 is provided and straddles the eye bolt adjacent the eye 11, this clip being of tapering thickness, so that when it is moved with reference to the eye bolt it may vary the distance at which the right angular portion 10 of the pintle stands from the side of the blade, this right angular portion 10 being clamped against the clip when the nut 13 on the eye bolt is tightened.

The guard 8 is formed with two holes 15 alined to act as gage points, so that when the pintle is set by the tightening of the bolts 4 and 12, the guard or roller 8 may be properly positioned with reference to the amount that it projects beyond the cutting edge of the blade 1. A spacer gage 16 which is used only when the guard is being set and is otherwise detached from the blade, is hung over the blade as shown in Fig. 1 so that its end may stand between the guard and the blade. Prior to the tightening of the bolt 12, the clip 14 may be adjusted to space the guard the proper distance from the blade 1 as determined by the thickness of the gage 16.

From the foregoing description and the accompanying drawings, I believe that a clear enough understanding of the invention is to be had to render further description unnecessary.

The invention having been described, what is claimed as new and useful is:

1. The combination with a peeling knife having a blade with perforations formed therein, of an eye bolt passing through one perforation, a headed bolt passing through the other perforation, a bifurcated guard support straddling and engaged underneath the head of the latter bolt, a pintle formed with a right angular bend, one end of the pintle engaging in the eye of the guard support and the right angular bend engaging in the eye of the eye bolt, a U-shaped clip straddling the eye bolt and carried between the right angular bend of the pintle and the blade, the clip being of tapering thickness so that the distance of the pintle from the blade may be varied, and a tubular guard member loosely mounted on the pintle for the useful purpose specified.

2. The combination with a peeling knife having a blade with a perforation formed therein, of an eye-bolt passing through the perforation, a pintle formed with a right angular bend the end of which is engaged in the eye of the eye-bolt, means for adjustably attaching the remaining end of the pintle to the blade, a U-shaped clip straddling the eye-bolt and interposed between the right angular bend of the pintle and the blade, the clip being of tapering thickness so that the distance of the pintle from the blade may be varied, and a tubular guard member loosely mounted on the pintle for the purpose specified.

3. The combination with a peeling knife having a blade with a perforation formed therein, of an eye-bolt passing through the perforation, a pintle formed with a right angular bend the end of which is engaged in the eye of the eye-bolt, means for adjustably attaching the remaining end of the pintle to the blade, a U-shaped clip straddling the eye-bolt and interposed between the right angular bend of the pintle and the blade, the clip being of tapering thickness so that the distance of the pintle from the blade may be varied, a tubular guard member loosely mounted on the pintle, and a spacer gage detachably engageable with the blade for insertion between the tubular guard member and the edge of the blade to enable the U-shaped clip to be adjusted to space the tubular guard member the desired distance from the blade.

4. The combination with a peeling knife having a blade formed with a perforation therein, of a headed bolt passing through said perforation, a bifurcated guard support straddling and engaged beneath the head of the bolt, a pintle having one end carried by the said guard support and the other end adjustably attached to the blade, a tubular guard member loosely mounted on the pintle, a nut carried on the headed bolt on the opposite side of the blade from the guard support, and a lever carried on the said bolt and clamped against the blade by the nut, the lever having its free end curved to provide a rest for the forefinger when the blade is engaged in a peeling operation.

In testimony whereof I affix my signature.

ERICK K. LIEN.